(12) United States Patent
Simonetti

(10) Patent No.: US 10,738,698 B2
(45) Date of Patent: Aug. 11, 2020

(54) INLET GUIDE VANE CONTROL FOR AIRCRAFT SINGLE ENGINE OPERATION

(71) Applicant: SIKORSKY AIRCRAFT CORPORATION, Stratford, CT (US)

(72) Inventor: Joseph Lawrence Simonetti, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 290 days.

(21) Appl. No.: 15/565,275

(22) PCT Filed: Mar. 22, 2016

(86) PCT No.: PCT/US2016/023622
§ 371 (c)(1),
(2) Date: Oct. 9, 2017

(87) PCT Pub. No.: WO2016/167925
PCT Pub. Date: Oct. 20, 2016

(65) Prior Publication Data
US 2018/0080380 A1 Mar. 22, 2018

Related U.S. Application Data

(60) Provisional application No. 62/147,724, filed on Apr. 15, 2015.

(51) Int. Cl.
*F02C 7/042* (2006.01)
*F02C 9/54* (2006.01)
(Continued)

(52) U.S. Cl.
CPC .............. *F02C 7/042* (2013.01); *B64C 27/04* (2013.01); *B64D 27/10* (2013.01); *B64D 33/02* (2013.01); *B64D 35/08* (2013.01); *F02C 7/26* (2013.01); *F02C 9/22* (2013.01); *F02C 9/42* (2013.01); *F02C 9/54* (2013.01); *B64C 27/06* (2013.01);
(Continued)

(58) Field of Classification Search
None
See application file for complete search history.

(56) References Cited

U.S. PATENT DOCUMENTS 3,930,366 A    1/1976  Nelson
2008/0279676 A1 * 11/2008  Dejoris .................. F01D 19/00
                                                                 415/1

(Continued)

FOREIGN PATENT DOCUMENTS

EP    2672076 A2    12/2013
JP    H0725303 A    10/1995

OTHER PUBLICATIONS

Bebesel, M. et al., "Bluecopter Demonstrator—An Approach to Eco-Efficient Helicopter Design", 2015, 41st European Rotorcraft Forum 2015, pp. 6-7 (Year: 2015).*

(Continued)

*Primary Examiner* — Scott J Walthour
(74) *Attorney, Agent, or Firm* — Cantor Colburn LLP

(57) ABSTRACT

A method of operating a multi-engine, rotary wing aircraft in a single engine, in-flight mode, the method includes stopping a first engine while operating a second engine; closing variable inlet guide vanes on the first engine; and turning a gas generator of the first engine at a reference rotational speed.

13 Claims, 3 Drawing Sheets

(51) Int. Cl.
  *F02C 9/22* (2006.01)
  *B64D 33/02* (2006.01)
  *B64C 27/04* (2006.01)
  *F02C 9/42* (2006.01)
  *B64D 27/10* (2006.01)
  *B64D 35/08* (2006.01)
  *F02C 7/26* (2006.01)
  *B64C 27/06* (2006.01)

(52) U.S. Cl.
  CPC ........... *B64D 2033/0273* (2013.01); *F05D 2220/323* (2013.01); *F05D 2220/329* (2013.01); *F05D 2260/85* (2013.01)

(56) References Cited

U.S. PATENT DOCUMENTS

| | | |
|---|---|---|
| 2010/0013223 A1 | 1/2010 | Certain |
| 2010/0164234 A1 | 7/2010 | Bowman et al. |
| 2011/0126547 A1 | 6/2011 | Nanataki et al. |
| 2011/0173988 A1* | 7/2011 | Sweet .............. B64D 31/06 60/773 |
| 2013/0139518 A1 | 6/2013 | Morgan |
| 2013/0219905 A1 | 8/2013 | Marconi et al. |
| 2014/0000272 A1 | 1/2014 | Fichtner et al. |

OTHER PUBLICATIONS

Dubois, Theirry, "Airbus Helicopters Unveils Bluecopter Demonstrator", Jul. 7, 2015, Business Aviation News: Aviation International News (Year: 2015).*

Veillette, Patrick, "Compressor Stalls in Turbine Helicopters", Feb. 1, 2012, Aviation Week, p. 3 (Year: 2012).*

Extended European Search Report; EP 16780429.3; dated Nov. 2, 2018, 9 pages.

PCT/US2016/023622, ISR/WO mailed Jun. 13, 2016, 13 pages.

* cited by examiner

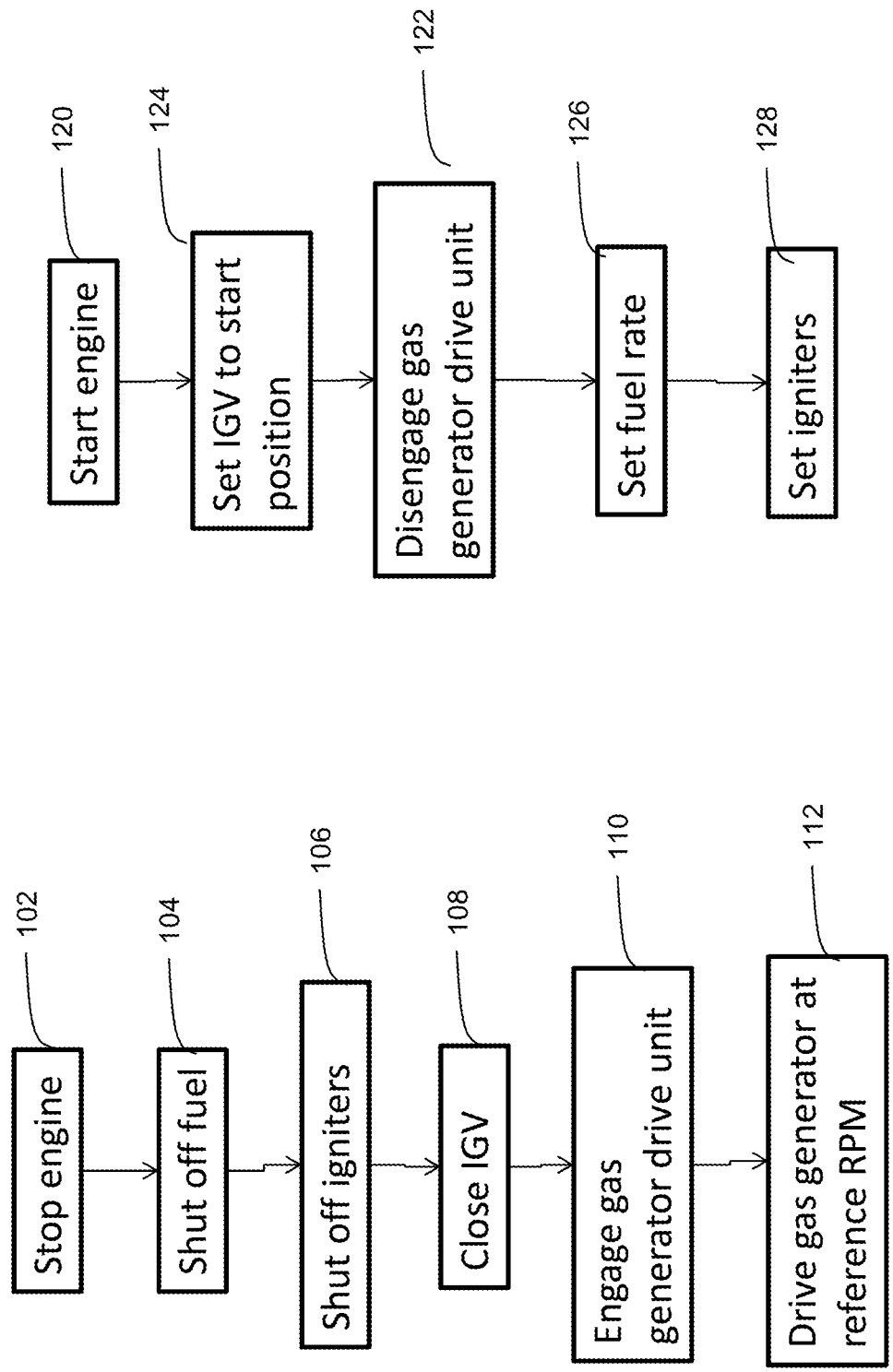

INLET GUIDE VANE CONTROL FOR AIRCRAFT SINGLE ENGINE OPERATION

CROSS REFERENCE TO RELATED APPLICATIONS

This application is a National Stage application of PCT/US2016/023622, filed Mar. 22,22016,which claims the benefit of U.S. Provisional Application No. 62/147,724, filed Apr. 15, 2015, both of which are incorporated by reference in their entirety herein.

BACKGROUND

The embodiments described herein relate generally to controlling engine inlet guide vanes, and more particularly, to controlling engine inlet guide vanes during single engine operation and multi-engine operation of a rotary wing aircraft.

Rotary wing aircraft having multiple engines may operate using a single engine. Significant range benefits can be obtained for multi-engine rotorcraft if the capability exists to shut down one engine during the cruise portion of a flight. An engine shut down in-flight, whether directed by the pilot or due to a system failure, needs to be capable of being restarted reliably and quickly.

BRIEF DESCRIPTION

According to one embodiment, a method of operating a multi-engine, rotary wing aircraft in a single engine, in-flight mode includes stopping a first engine while operating a second engine; closing variable inlet guide vanes on the first engine; and turning a gas generator of the first engine at a reference rotational speed.

In addition to one or more of the features described above, or as an alternative, further embodiments may include wherein turning the gas generator at the reference rotational speed includes monitoring rotational speed of the gas generator and adjusting the rotational speed in response to the monitoring.

In addition to one or more of the features described above, or as an alternative, further embodiments may include wherein the reference rotational speed is an idle revolutions per minute.

In addition to one or more of the features described above, or as an alternative, further embodiments may include wherein the first engine is a turboshaft engine.

In addition to one or more of the features described above, or as an alternative, further embodiments may include wherein the gas generator comprises a compression section, a combustion section, a turbine section.

In addition to one or more of the features described above, or as an alternative, further embodiments may include opening the variable inlet guide vanes to a start position in response to a request to start the first engine in-flight.

According to another embodiment, a system for operating a multi-engine, rotary wing aircraft in a single engine, in-flight mode includes an engine having a gas generator; variable inlet guide vanes positioned on the engine, the variable inlet guide vanes admitting air into the engine; a gas generator drive unit to rotate the gas generator; a controller coupled to the variable inlet guide vanes and the gas generator drive unit, the controller issuing command signals to close the variable inlet guide vanes and turn the gas generator at a reference rotational speed when the engine is stopped in the in-flight mode.

In addition to one or more of the features described above, or as an alternative, further embodiments may include a sensor to measure a rotational speed of the gas generator; the controller monitoring the rotational speed of the gas generator and adjusting the rotational speed in response to the sensor.

In addition to one or more of the features described above, or as an alternative, further embodiments may include wherein the engine is a turboshaft engine.

In addition to one or more of the features described above, or as an alternative, further embodiments may include wherein the gas generator comprises a compression section, a combustion section, a turbine section.

In addition to one or more of the features described above, or as an alternative, further embodiments may include wherein the gas generator drive unit includes at least one of a clutch, an electric motor or a hydraulic motor.

In addition to one or more of the features described above, or as an alternative, further embodiments may include wherein the controller issues a command signal to open the variable inlet guide vanes to a start position in response to a request to start the engine in-flight.

In addition to one or more of the features described above, or as an alternative, further embodiments may include wherein the controller issues a command signal to disengage the gas generator drive unit from the gas generator in response to a request to start the engine in-flight.

Embodiments provide the technical effect of facilitating restarting of an engine of an aircraft when the aircraft is operating in a single engine operating mode in-flight.

BRIEF DESCRIPTION OF THE DRAWINGS

The foregoing and other features and advantages of the present disclosure are apparent from the following detailed description taken in conjunction with the accompanying drawings in which:

FIG. 3 is a flow chart of a process for stopping an engine in-flight in an exemplary embodiment; and FIG. 4 is a flow chart of a process for starting an engine in-flight in an exemplary embodiment.

DETAILED DESCRIPTION

Figure 1:
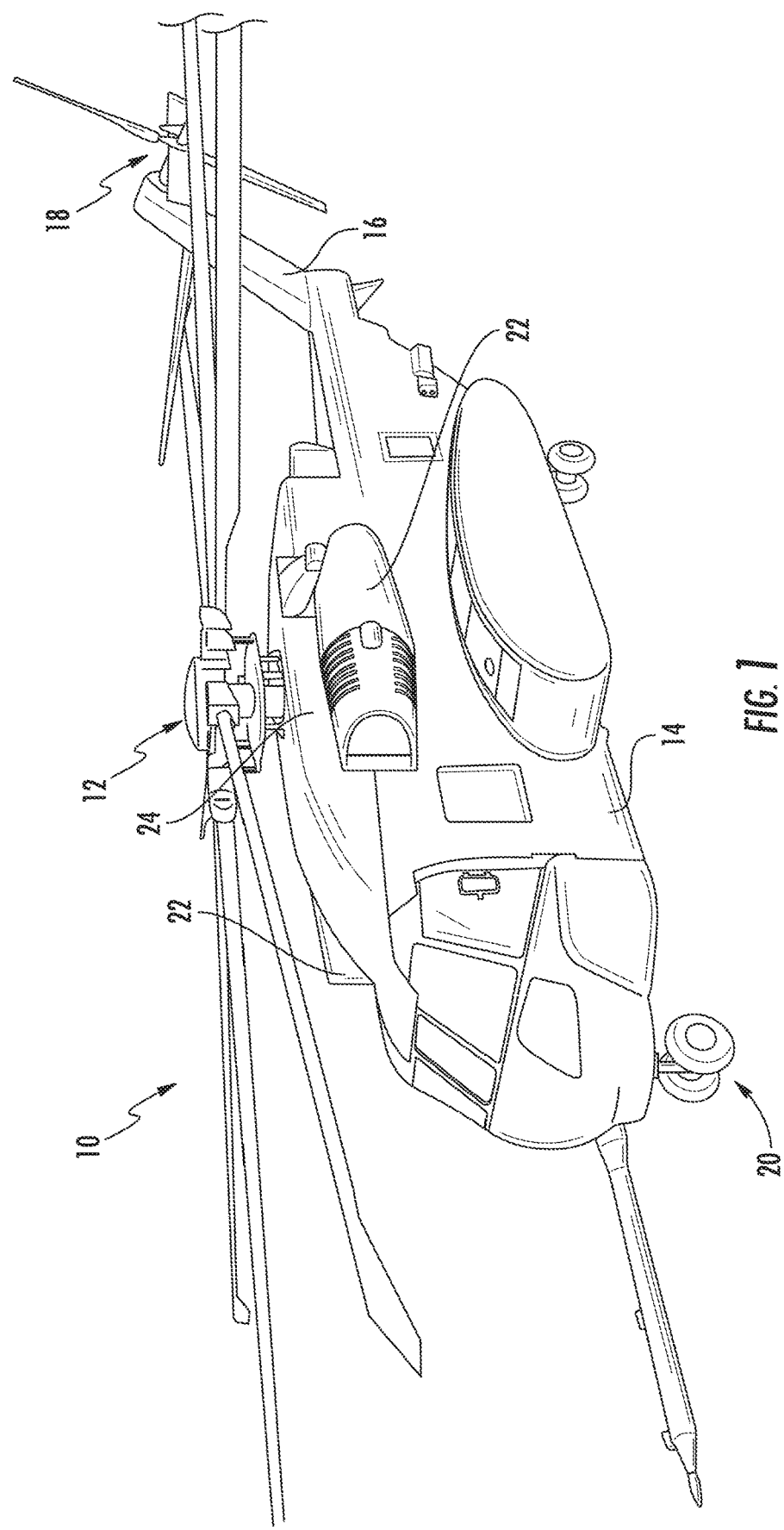
FIG. 1 is a perspective view of a rotary wing aircraft in an exemplary embodiment.

Referring to FIG. 1, schematically illustrated is a rotary-wing aircraft 10 having a main rotor system 12 in an exemplary embodiment. The aircraft 10 includes an airframe 14 having an extending tail 16 which mounts a tail rotor system 18, such as an anti-torque system. The main rotor assembly 12 is driven through a main gearbox 24 by one or more engines 22. Although two engines 22 are shown, it is understood that more than two engines may be employed. The aircraft 10 employs at least one landing gear assembly 20 during landing and while performing land-based maneuvers on a ground surface. Although a particular helicopter configuration is illustrated and described in the disclosed embodiment, other configurations and/or machines, such as jet aircraft, high speed compound rotary wing aircraft with supplemental translational thrust systems, dual contra-rotating, coaxial rotor system aircraft, turbo-props, tilt-rotors and tilt-wing aircraft, and the like may also benefit from the embodiments described herein. Aircraft 10 may be a piloted vehicle (e.g., a manned aircraft), an unmanned aerial vehicle, optionally piloted vehicle, etc.

Figure 2:
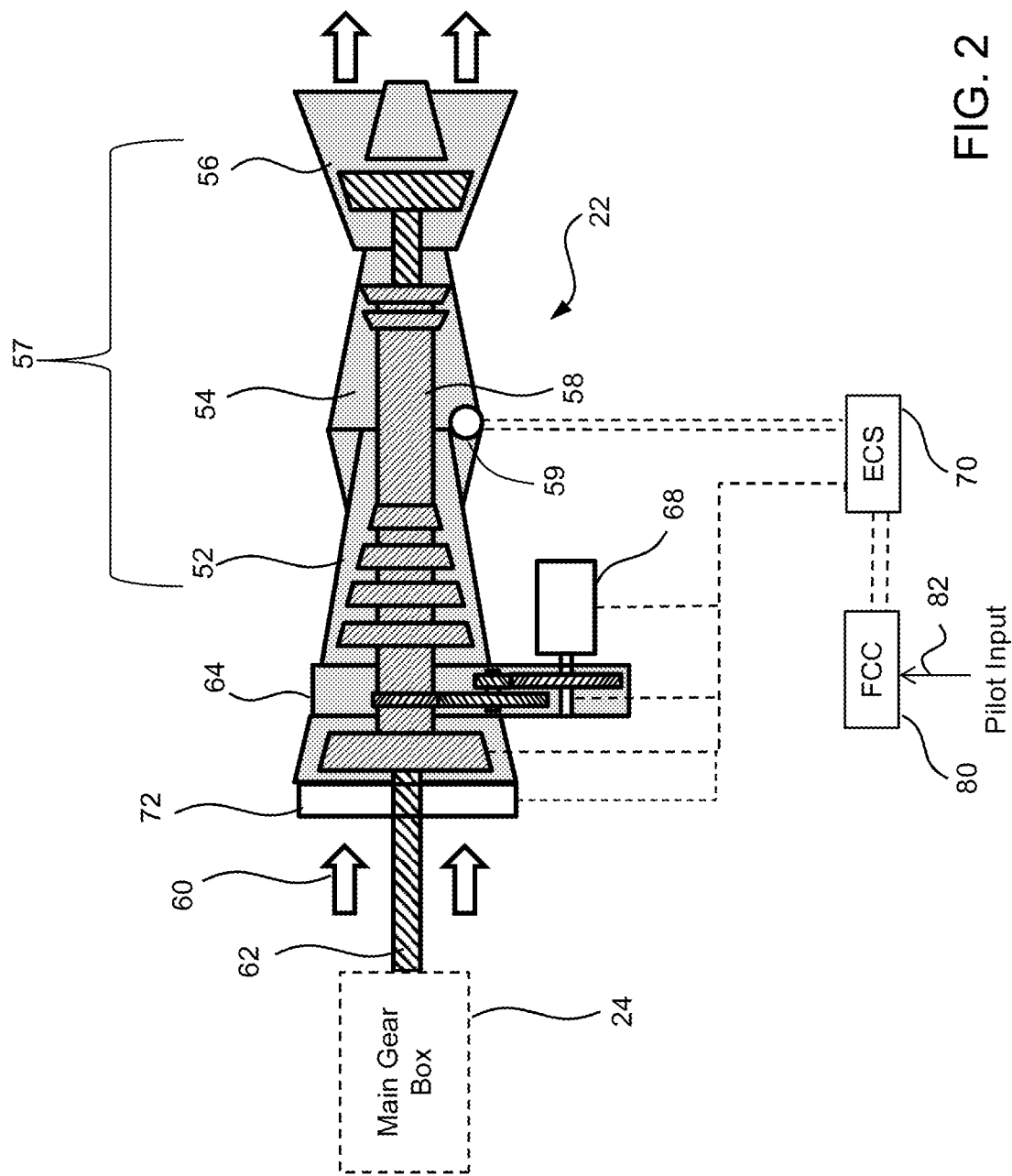
FIG. 2 depicts an engine starting system in an exemplary embodiment.

FIG. 2 depicts a schematic view of an engine starting system for the rotary wing aircraft 10 (see FIG. 1) according to an exemplary embodiment. The engine starting system includes one or more internal combustion engines 22 (although only one engine 22 is depicted in FIG. 2), a gas generator drive unit 68, an engine controller 70 such as an Engine Control System (ECS) and a flight control computer (FCC) 80. It is to be understood that ancillary systems that may be coupled to the internal combustion engine 22 and the main gear box 24, such as a fuel system, pumps, or individual blade control (IBC) servos, hydraulic actuators/motors, aircraft electric power generators, etc. or the like are not shown in FIG. 2 for ease of description of embodiments.

As illustrated in FIG. 2, the turboshaft engine 22 includes a compression section 52, a combustion section 54, a turbine section 56, and a two spool rotor system having a compressor drive shaft 58 and an engine output shaft 62. Although this represents one configuration, a gas turbine may incorporate any number of other flow path configurations which may include high and low pressure compressors and associated turbines, recuperators, etc. The compression section 52, combustion section 54 and turbine section 56 may be referred to as parts of a gas generator 57. A sensor 59 (e.g., a rotary encoder) may be used to monitor the speed of rotation of the gas generator 57. Typically, the compression section 52 compresses inlet air 60 at an intake end of the internal combustion engine 22 and provides the compressed air to the combustion section 54. The inlet air 60 passes through variable inlet guide vanes 72. The variable inlet guide vanes 72 may open or close (or assume intermediary positions between open and closed) in response to a command signal from the controller 70. The variable inlet guide vanes 72 are capable of closing to reduce or block airflow into the compression section 52 when the engine 22 is stopped.

Fuel is added to the compressed air, and the resulting mixture is ignited within the combustion section 54 in order to produce combustion gases. The combustion gases are directed to the turbine section 56, which extracts energy from the combustion gases to rotate the compressor drive shaft 58 and the engine output shaft 62. The compressor drive shaft 58 is coupled to a gearbox 64 which receives the mechanical energy from the compressor drive shaft 58 to power various accessories like a fuel pump, engine lubrication system pump, and other accessories including but not limited to generators for the supply electric power for flight operations. An engine output shaft 62 provides the motive force to the main gear box 24 to drive the main rotor assembly 12 and the tail rotor system 18.

The engine starting system of FIG. 2 includes an engine controller 70 that is in communication with the internal combustion engine 22, the gas generator drive unit 68 and the variable inlet guide vanes 72. The engine controller 70 may be implemented using a Full Authority Digital Engine Controller (FADEC). In an embodiment, the engine controller 70 receives commands to stop the engine 22 or start the engine 22. In particular, and as will be described in more detail, the engine controller 70 provides command signals to, and may receive feedback signals from, the gas generator 57 of engine 22, the gas generator drive unit 68 and the variable inlet guide vanes 72, and a fuel system (not shown). Commands may also come from a pilot 82 or from a flight control computer (FCC) 80 automation. The engine controller 70 and the FCC 80 may include memory to store instructions that are executed by a processor. The executable instructions may be stored or organized in any manner and at any level of abstraction, such as in connection with controlling engine starting system. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the engine 22.

The engine controller 70 and/or the FCC 80 can receive a number of diagnostic inputs used to execute in-flight engine stopping and starting. The FCC 80 is responsive to pilot input 82 and may also self-initiate operations such as engine restart based on one or more monitored conditions.

FIG. 3 depicts an exemplary process executed by the engine controller 70 to stop the engine 22 during an in-flight mode (e.g., cruise). The process begins at 102 where a request to stop an engine is generated (e.g., by the pilot or the FCC). As noted above, the rotary wing aircraft 10 may operate in single engine operation mode to improve fuel economy during cruise portions of flight. At 104, fuel to the engine 22 is stopped and the igniters are powered off at 106, if the igniters were active. At 108, the controller 70 closes the variable inlet guide vanes 72 to reduce or stop all airflow into the compressor section 52 of the engine 22. Closing the variable inlet guide vanes 72 reduces pumping losses over the gas generator 57, making it easier to turn the gas generator 57 at a reference rotational speed (e.g., idle RPM). As less air is being pumped by the compressor section 52, less power is needed to turn the gas generator 57.

At 110, the gas generator drive unit 68 is activated to rotate the gas generator 57. The gas generator drive unit 68 is used to turn the gas generator 57 at a reference RPM, so that the engine 22 can be restarted rapidly. If the gas generator 57 was stationary, it would take additional time to bring the gas generator 57 up to speed for restart. The gas generator drive unit 68 may include one or more gears/clutches engaged in response to a command signal from the controller 70. The gas generator drive unit 68 may be powered from the main gear box 24. In other exemplary embodiments, the gas generator drive unit 68 is implemented using an electric motor or a hydraulic motor to impart rotation to the gas generator 57, under command of the controller 70. At 112, the controller 70 monitors RPM of the gas generator 57 (e.g., through a sensor 59) and provides command signals to the gas generator drive unit 68 to maintain the gas generator 57 rotating at the reference rotational speed.

FIG. 4 depicts an exemplary process executed by the engine controller 70 to start the engine 22 during flight. The process begins at 120, where a request to start the engine 22 is generated (e.g., by the pilot input 82 or the FCC 80). In response, the controller 70 sends a command signal to the variable inlet guide vanes 72 at 124 to position the variable inlet guide vanes 72 in a start position (e.g., a position providing suitable air for starting). At 122, the gas generator drive unit 68 is disengaged or disabled. The gas generator 57 is still rotating at the desired starting RPM when the starting fuel rate is set at 126 and the igniters activated at 128. The engine 22 then starts in-flight.

Embodiments improve single engine operation efficiency by reducing the horsepower needed to rotate the gas generator of the stopped engine. By closing the variable inlet guide vanes on the stopped engine, less power is required to turn the gas generator at a reference RPM.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the embodiments. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a multi-engine, rotary wing aircraft in a single engine, in-flight mode, the method comprising:
   stopping a first engine while operating a second engine;
   closing variable inlet guide vanes on the first engine to stop all airflow into the first engine; and
   turning a gas generator of the first engine at a reference rotational speed while the variable inlet vanes are closed.

2. The method of claim 1, wherein:
   turning the gas generator at the reference rotational speed includes monitoring
   a rotational speed of the gas generator and adjusting the rotational speed in response to the monitoring.

3. The method of claim 1, wherein:
   the reference rotational speed is an idle revolutions per minute.

4. The method of claim 1, wherein:
   the first engine is a turboshaft engine.

5. The method of claim 1, wherein:
   the gas generator comprises a compression section, a combustion section and a turbine section.

6. The method of claim 1, further comprising:
   opening the variable inlet guide vanes to a start position in response to a request to start the first engine in-flight.

7. A system for operating a multi-engine, rotary wing aircraft in a single engine, in-flight mode, the system comprising:
   an engine having a gas generator;
   variable inlet guide vanes positioned on the engine, the variable inlet guide vanes configured to admit air into the engine;
   a gas generator drive unit to rotate the gas generator; and
   a controller coupled to the variable inlet guide vanes and the gas generator drive unit, the controller configured to issue command signals to close the variable inlet guide vanes to stop all airflow into the engine and turn the gas generator at a reference rotational speed when the engine is stopped in the in-flight mode and while the variable inlet guide vanes are closed.

8. The system of claim 7, further comprising:
   a sensor to measure a rotational speed of the gas generator;
   the controller being configured to monitor the rotational speed of the gas generator and adjust the rotational speed in response to the sensor.

9. The system of claim 7, wherein:
   the engine is a turboshaft engine.

10. The system of claim 7, wherein:
    the gas generator comprises a compression section, a combustion section and a turbine section.

11. The system of claim 7, wherein:
    the gas generator drive unit includes at least one of a clutch, an electric motor or a hydraulic motor.

12. The system of claim 7, wherein:
    the controller is configured to issue a command signal to open the variable inlet guide vanes to a start position in response to a request to start the engine in-flight.

13. The system of claim 7, wherein:
    the controller is configured to issue a command signal to disengage the gas generator drive unit from the gas generator in response to a request to start the engine in-fight.

* * * * *